US012602134B2

(12) United States Patent
Chu et al.

(10) Patent No.: US 12,602,134 B2
(45) Date of Patent: Apr. 14, 2026

(54) ELECTRONIC DEVICE HAVING A TOUCH LAYER OVERLAPPING A DISPLAY PANEL

(71) Applicant: InnoLux Corporation, Miao-Li County (TW)

(72) Inventors: Chun-Li Chu, Miao-Li County (TW); Wei-Kang Ji, Miao-Li County (TW); Yu-Sheng Kao, Miao-Li County (TW); Chih-Yi Chen, Miao-Li County (TW); Shang-Ming Yen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/962,055

(22) Filed: Nov. 27, 2024

(65) Prior Publication Data

US 2025/0208736 A1     Jun. 26, 2025

(30) Foreign Application Priority Data

Dec. 22, 2023    (CN) .......................... 202311785147.1

(51) Int. Cl.
*G09G 3/30* (2006.01)
*G06F 3/041* (2006.01)
(Continued)

(52) U.S. Cl.
CPC .......... *G06F 3/04184* (2019.05); *G06F 3/046* (2013.01); *G09G 3/32* (2013.01); *G09G 2310/08* (2013.01)

(58) Field of Classification Search
CPC ... G06F 3/04184; G09G 3/30; G09G 2310/08
See application file for complete search history.

(56) References Cited

U.S. PATENT DOCUMENTS

2003/0034992 A1\* 2/2003 Brown Elliott ....... G06T 3/4069
                                                    345/690
2014/0002413 A1\* 1/2014 Kim ...................... G06F 3/0446
                                                    345/174

(Continued)

FOREIGN PATENT DOCUMENTS

CN      108550351 A     9/2018
TW      202125173 A     7/2021

*Primary Examiner* — Sanghyuk Park
(74) *Attorney, Agent, or Firm* — McClure, Qualey & Rodack, LLP

(57) ABSTRACT

An electronic device is provided, which includes a display panel, a timing control unit, a touch layer, a touch control unit, a processing unit, a light-emitting layer, and a light source driving unit. The timing control unit is electrically connected to the display panel and provides synchronization signals. The touch layer and the light-emitting layer overlap the display panel. The touch control unit is electrically connected to the touch control layer and provides a touch signal. The processing unit is electrically connected to the timing control unit and the touch control unit and generates a light-emitting signal according to the synchronization and touch signals. The light source driving unit is electrically connected to the processing unit and controls the light-emitting layer according to the light-emitting signal to emit light in the first light-emitting mode during the first frame and in the second light-emitting mode during the second frame.

18 Claims, 6 Drawing Sheets

(51) Int. Cl.
  *G06F 3/046* (2006.01)
  *G09G 3/32* (2016.01)

(56) References Cited

U.S. PATENT DOCUMENTS

2019/0231184 A1* 8/2019 Alawa .................. A61B 3/0033
2023/0367419 A1* 11/2023 Seo ....................... G06F 3/0412
2024/0135847 A1* 4/2024 Ye ........................... G09G 3/20

* cited by examiner

ELECTRONIC DEVICE HAVING A TOUCH LAYER OVERLAPPING A DISPLAY PANEL

CROSS REFERENCE TO RELATED APPLICATIONS

This application claims priority of China Patent Application No. 202311785147.1, filed on Dec. 22, 2023, the entirety of which is incorporated by reference herein.

BACKGROUND OF THE INVENTION

Field of the Invention

The present disclosure relates to electronic devices, and, in particular, to an electronic device having different light-emitting modes within different frames.

Description of the Related Art

Electronic devices with touch functionality, such as tablets, smartphones, and monitors, have become indispensable necessities in modern society. With the boom in such electronic devices, consumers have high expectations regarding the quality, functionality, or price of these products.

In order to meet consumer expectations, these electronic devices are configured into specific structures to reduce costs and achieve the development trend of being thin, light, and compact. For example, the energy consumption of an electronic device can be reduced by causing multiple groups of light-emitting units in the electronic device to emit light sequentially. Alternatively, the overall thickness of the electronic device can also be reduced by making the light-emitting unit and the touch unit of the electronic device share one substrate. However, these specific structures may cause signals from the light-emitting unit and the touch unit to interfere with each other, thereby causing some unexpected problems.

Therefore, although the existing electronic devices have largely met their intended purposes, they do not meet requirements in all respects. Therefore, there are still some problems that need to be overcome regarding the electronic devices.

BRIEF SUMMARY OF THE INVENTION

In some embodiments, an electronic device is provided. The electronic device includes a display panel, a timing control unit, a touch layer, a touch control unit, a processing unit, a light-emitting layer, and a light source driving unit. The timing control unit is electrically connected to the display panel and used to provide a plurality of synchronization signals. The touch layer overlaps the display panel. The touch control unit is electrically connected to the touch control layer and used to provide a touch signal. The processing unit is electrically connected to the timing control unit and the touch control unit and generates a light-emitting signal according to the synchronization signals and the touch signal. The light-emitting layer overlaps the display panel. The light source driving unit is electrically connected to the processing unit and controls the light-emitting layer according to the light-emitting signal to emit light in the first light-emitting mode during the first frame and emit light in the second light-emitting mode during the second frame.

The electronic device of the present disclosure can be applied in a variety of displays. In order to make the features and advantages of the present disclosure more comprehensible, various embodiments are specially cited hereinafter, together with the accompanying drawings, to be described in detail as follows.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 6A is a schematic cross-sectional view showing the structure of the electronic device according to some embodiments of the present disclosure.

FIG. 6B is a schematic cross-sectional view showing the structure of the electronic device according to other embodiments of the present disclosure.

FIG. 6C is a schematic cross-sectional view showing the structure of the electronic device according to further embodiments of the present disclosure.

DETAILED DESCRIPTION OF THE INVENTION

Figure 1:
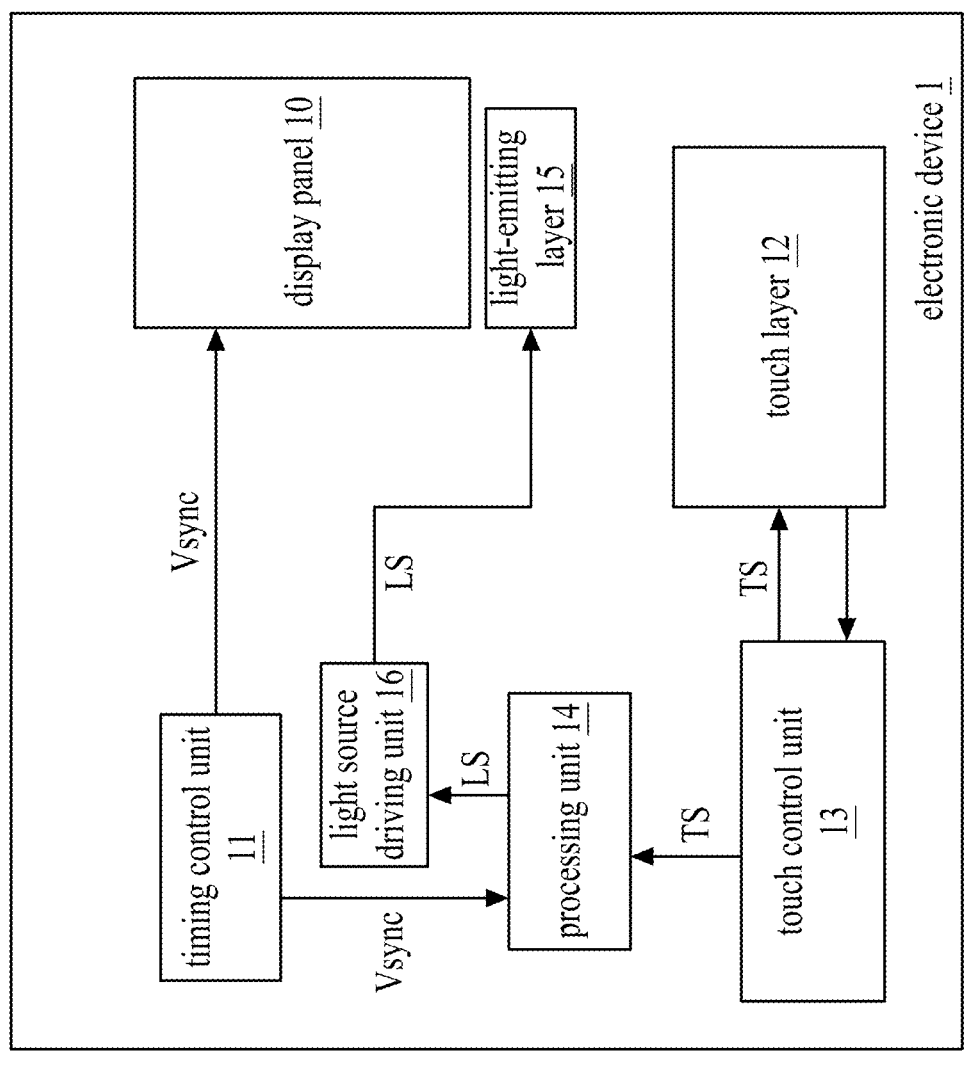
FIG. 1 is a block diagram showing the electronic device according to some embodiments of the present disclosure.

In order to make the above objects, features, and benefits of some embodiments of the present disclosure more obvious and understandable, detailed descriptions are given hereinafter with reference to the drawings.

It should be understood that the terms "include" and "comprise" used in the present disclosure are used to indicate the existence of specific technical features, numerical values, method steps, operation processes, elements, and/or components, but do not exclude that more technical features, numerical values, method steps, operation processes, elements, components, or any combination thereof may be added.

The terms such as "first", "second", "third", "fourth", and the like are used to modify elements and are not used to indicate the priority or precedence relationship therebetween but are used to clearly distinguish elements with the same name.

It should be noted that, in the following embodiments, features in several different embodiments may be replaced, recombined, and bonded to complete other embodiments without departing from the spirit of the present disclosure. The features of the various embodiments can be used in any combination as long as they do not violate the spirit of the present disclosure or conflict with each other.

In the present disclosure, the electronic device may include a display device, a back light device, an antenna device, a sensing device, or a titling device, but the present disclosure is not limited thereto. The electronic device may be a foldable or flexible electronic device. The display device may be a non-self-luminous display device or a self-luminous display device. The antenna device may be a liquid-crystal antenna device or a non-liquid-crystal antenna device. The sensing device may be a sensing device for sensing capacitance, light, heat, or ultrasonic waves, but the present disclosure is not limited thereto. The electronic elements may include passive elements and active elements, such as capacitors, resistors, inductors, diodes, transistors, and the like. The diodes may include light-emitting diodes or photodiodes. The light-emitting diodes may include, for example, organic light-emitting diodes (OLEDs), mini light-emitting diodes (mini LEDs), micro light-emitting diodes (micro LEDs), or quantum dot light-emitting diodes (quantum dot LED), but the present disclosure is not limited thereto. The titling device may be, for example, a display titling device or an antenna titling device, but the present disclosure is not limited thereto. It should be noted that, the electronic device can be any arrangement and combination of the foregoing, but the present disclosure is not limited thereto. The content of the present disclosure will be described hereinafter with an electronic device as a display device or a titling device, but the present disclosure is not limited thereto.

In addition, the shape of the electronic device may be a rectangle, a circle, a polygon, a shape with curved edges, or other suitable shapes. The electronic device may have peripheral systems such as a processing system, a driving system, a control system, a light source system, and a shelf system to support the electronic device.

In some embodiments, additional features may be added to the electronic device of the present disclosure. In some embodiments, some features of the electronic device disclosed herein may be replaced or omitted. In some embodiments, additional operation steps may be provided before, during, and after the electronic device. In some embodiments, some of the described operation steps may be replaced or omitted, and the order of some of the described operation steps may be interchangeable. Furthermore, it should be understood that some of the described operation steps may be replaced or deleted for other embodiments of the method. Moreover, in the present disclosure, the number and size of each element in the drawings are only for illustration, and are not used to limit the scope of the present disclosure.

FIG. 1 is a block diagram of the electronic device according to some embodiments of the present disclosure. As shown in the figure, the electronic device 1 includes the display panel 10, the timing control unit 11, the touch layer 12, the touch control unit 13, the processing unit 14, the light-emitting layer 15, and the light source driving unit 16. The timing control unit 11 is electrically connected to the display panel 10 and is configured to provide the synchronization signals Vsync. The touch control unit 13 is electrically connected to the touch control layer 12 and is configured to provide the touch signal TS. The processing unit 14 is electrically connected to the timing control unit 11 and the touch control unit 13, and the processing unit 14 may generate the light-emitting signal LS according to the synchronization signal Vsync sent by the timing control unit 11 and the touch signal TS provided by the touch control unit 13. The light-emitting layer 15 is used to provide a light source to the display panel 10. The light source driving unit 16 is electrically connected to the processing unit 14, and the light source driving unit 16 may control the light-emitting mode of the light-emitting layer 15 through the light-emitting signal LS. For example, the light-emitting period of the light-emitting units in the light-emitting layer 15 may be avoided from the touch sensing period of the touch unit in the touch layer 12, thereby avoiding the problem of signal interference, which will be described in detail in the following. According to some embodiments, the above-mentioned time-sharing driving methods of light-emitting and touch may be applied to in-cell structures, out-cell structures, and other types of structures, and the present disclosure is not limited thereto.

Figure 2:
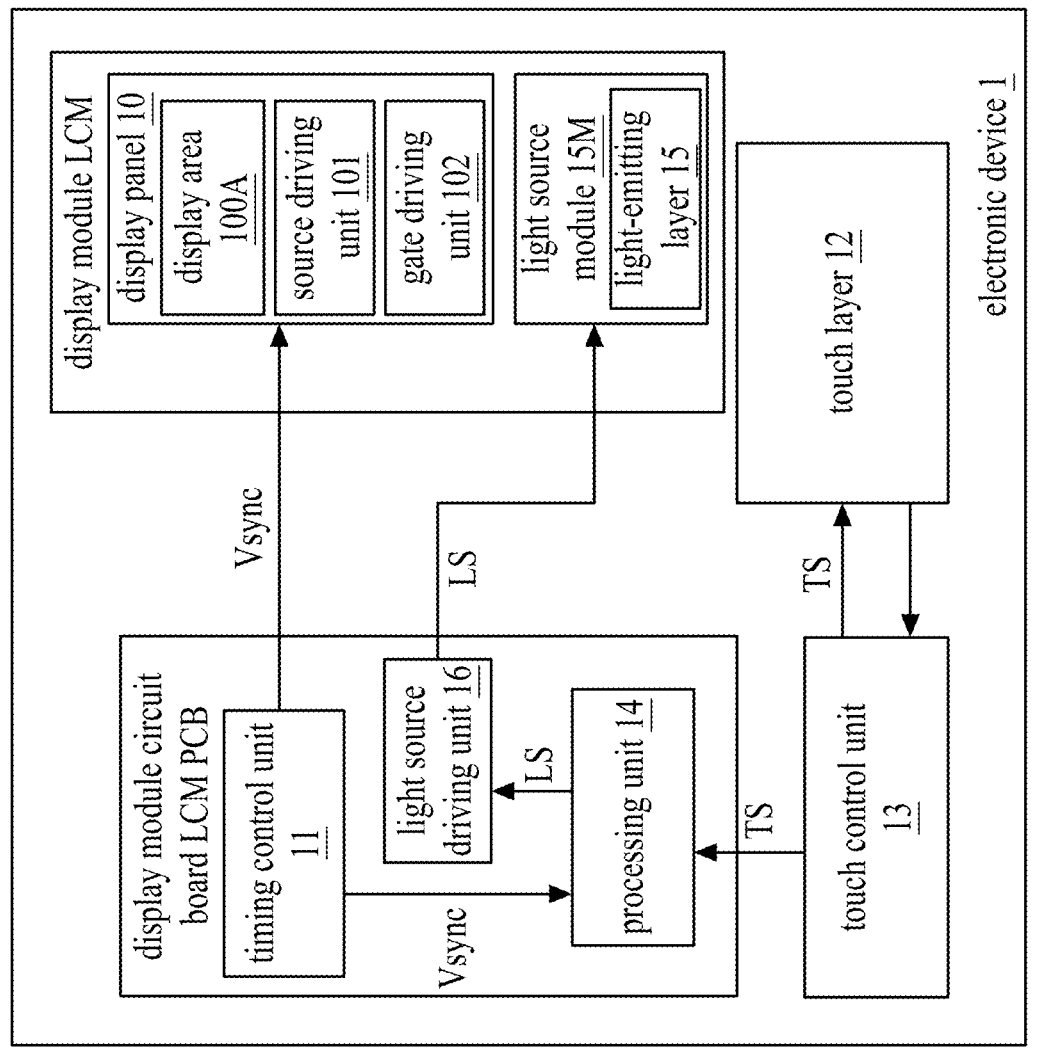
FIG. 2 is a block diagram showing the electronic device according to other embodiments of the present disclosure.

FIG. 2 is a block diagram showing the electronic device according to other embodiments of the present disclosure. As shown in the figure, in some embodiments, the electronic device 1 further includes the display module LCM, and the display module LCM may include the display panel 10 and the light-emitting layer 15. In some embodiments, the electronic device 1 further includes the display module circuit board LCM PCB, and the display module circuit board LCM PCB may include the timing control unit 11, the processing unit 14, and the light source driving unit 16. In some embodiments, the display module LCM may include the display panel 10 and the light source module 15M, and the light source module 15M may include the light-emitting layer 15. According to some embodiments, the electronic device 1 may include a touch circuit board, and the touch circuit board may include the touch control unit 13. The display module LCM may be a liquid crystal display module or a light-emitting display module, but the present disclosure is not limited thereto. The light-emitting display module may include organic light-emitting diodes, inorganic light-emitting diodes, or a combination thereof.

It should be noted that in the embodiment shown in FIG. 2, the descriptions regarding the display module LCM, the display module circuit board LCM PCB, and the light source module 15M is used to clarify and understand the functions and connection relationships between the components, which is not intended to limit the distance and relative position between various components. Moreover, FIG. 2 is only a schematic block diagram but not an illustration of a specific structure. For example, although the display module LCM includes the display panel 10 and the light-emitting layer 15, other components, such as the touch layer 12, may be disposed between the display panel 10 and the light-emitting layer 15.

As shown in FIG. 2, the display panel 10 is used to display a plurality of image screens. In the following, the term "frame" may be used to refer to an image screen. Therefore, the display panel 10 may be said to be used to display a plurality of frames. In some embodiments, the display panel 10 may be any suitable display panel, such as a liquid crystal display panel, but the present disclosure is not limited thereto.

Figure 3:
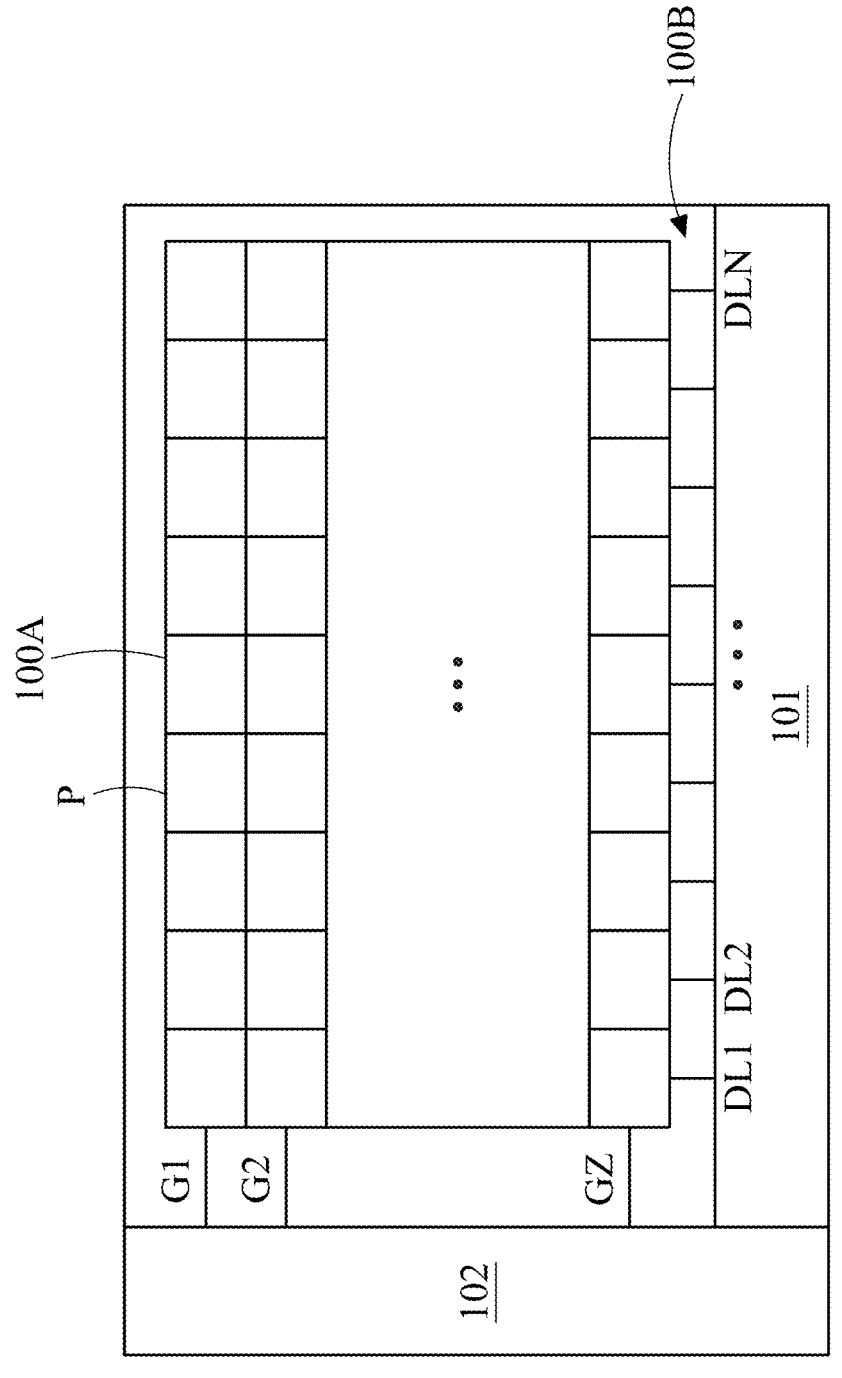
FIG. 3 is a schematic top view of the display panel according to other embodiments of the present disclosure.
Figure 3:
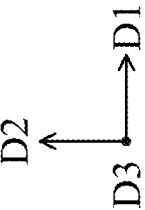

FIG. 3 is a schematic diagram showing the display panel 10 according to some embodiments of the present disclosure. As shown in FIG. 3, in some embodiments, the display panel 10 may include the display area 100A and the peripheral area 100B, and the display area 100A and the peripheral area 100B are adjacent to each other. According to some embodiments, the display panel 10 includes the display units P, the source driving unit 101, and the gate driving unit 102. The source driving unit 101 and the gate driving unit 102 may be disposed in the peripheral area 100B and are used to control the display units P of the display panel 10 to scan during the first frame Fa and the second frame Fb (which will be further explained below). The display units P may be arranged in a matrix and disposed in the display area 100A. That is, the display units P may be a plurality of display units arranged along the first direction D1 and along the second direction D2. The first direction D1 may be different from the second direction D2, for example, may be perpendicular. According to some embodiments, although not shown in the figure, the source driving unit 101 and/or the gate driving unit 102 may be disposed outside the display panel 10.

In some embodiments, the gate lines G1, G2 . . . GZ may extend along the first direction D1 and be electrically connected to the gate driving unit 102. Each gate line may be electrically connected to one row of the display units P. For simplicity of illustration, the entire of each gate line is not shown in FIG. 3 but only a part of each gate line. In some embodiments, there may be one, two, or more gate driving units 102, but the present disclosure is not limited thereto. In some embodiments, the data lines DL1, DL2 . . . DLN may extend along the second direction D2 and be electrically connected to the source driving unit 101. Each data line may be electrically connected to one column of the display units P. For simplicity of illustration, the entire of each data line is not shown in FIG. 3 but only a part of each data line.

As mentioned above, each display unit P may be electrically connected to the gate driving unit 102 through one gate line, and electrically connected to the source driving unit 101 through one data line. The display units P may be used to display three primary color signals such as R, G, and B, but the present disclosure is not limited thereto. The display units P may include a pixel electrode, a corresponding driving unit (such as a transistor), a common electrode, a display medium, etc., and the descriptions are omitted. The source driving unit 101 may be used to input a signal to the display units P in the display area 100A, and the gate driving unit 102 may be used to perform switching operation of the display units P (or pixel units) of each row of the display area 100A. When the display panel 10 performs the scanning operation of the display area 100A, the gate driving unit 102 may turn on a whole row of pixels sequentially and let the source driving unit 101 be responsible for the signal input operation of the display area 100A so as to provide the pixels in the display area 100A the required signal. For example, the gate driving unit 102 may be used to scan the display panel 10 during each display screen. In this way, the gate driving unit 102 may sequentially turn on (scan) the display units P in the first row, the second row . . . and the last row. The display medium may include, for example, liquid crystals, organic light-emitting diodes, inorganic light-emitting diodes, or a combination thereof. The synchronization signals are shown as in FIG. 1, the timing control unit 11 is electrically connected to the display panel 10 and is used to provide the synchronization signals Vsync to the display panel 10. When the display panel 10 receives the synchronization signals Vsync, the multiple rows of display units P in the display area 100A of the display panel 10 are sequentially turned on to display image screens.

Figure 5:
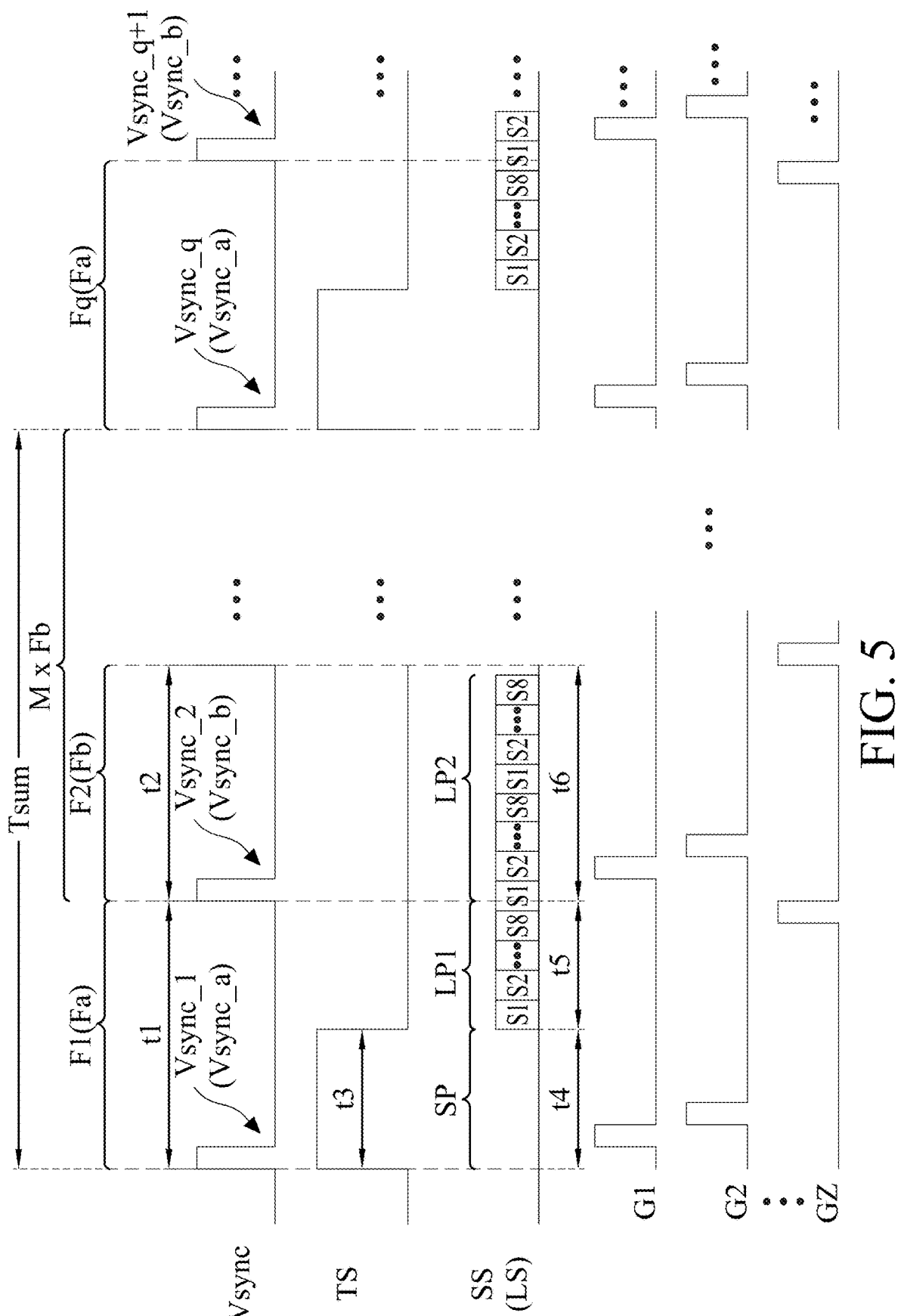
FIG. 5 is a timing diagram showing the electronic device according to some embodiments of the present disclosure.

For example, as shown in FIG. 3 and FIG. 5, the display units P in the display area 100A of the display panel 10 may sequentially display multiple frames, such as frames F1, F2, F3, . . . , Fq . . . , etc., according to the synchronization signals Vsync_1, Vsync_2, Vsync_3, . . . Vsync_q, Vsync_q+1 . . . , etc. That is, one synchronization signal Vsync starts one frame. For example, the synchronization signal Vsync_1 starts the frame F1, and the synchronization signal Vsync_2 starts the frame F2.

As shown in FIG. 3 and FIG. 5, the timing control unit 11 may provide the first synchronization signal Vsync_a and the second synchronization signal Vsync_b. The display panel 10 displays the first image screen (or the first frame Fa) according to the first synchronization signal Vsync_a of the synchronization signal and displays the second image screen (or the second frame Fb) according to the second synchronization signal Vsync_b of the synchronization signal. For example, as shown in FIG. 5, the display panel may sequentially display the frames F1, F2, F3, . . . , Fq, etc. according to the synchronization signals Vsync_1, Vsync_2, Vsync_3, . . . Vsync_q, Vsync_q+1 . . . , etc. Among them, Vsync_1 and Vsync_q are the first frame Fa, and the frames between Vsync_1 and Vsync_q are the second frames Fb. That is, the display panel 10 may be used to sequentially display a plurality of frames, and these frames may include two first frames Fa (Vsync_1 and Vsync_q) displayed in sequence and the (number of) M second frames Fb between the two first frames Fa. The (number of) M second frames Fb include the frame F2. As shown in FIG. 5, the first frame Fa (F1) and the second frame Fb (F2) are adjacent. In some embodiments, M may be a positive integer between 2 and 15, but the present disclosure is not limited thereto.

It should be noted that in the present disclosure, the terms "first frame Fa" and "second frame Fb" are distinguished by whether there is a touch signal TS during the current image screen, rather than referring to the display order of the two display screens. However, in FIG. 5, the first frame Fa and the second frame Fb are frames displayed sequentially. The detailed descriptions are described further below. In some embodiments, the timing control unit 11 may provide a synchronization signal at a fixed period, so that each frame displayed by the display panel 10 has the same length. In other words, each frame has the same length. However, the present disclosure is not limited thereto. In other embodiments, the lengths of individual frames may also differ from each other.

Figures 6A, 6B, 6C:
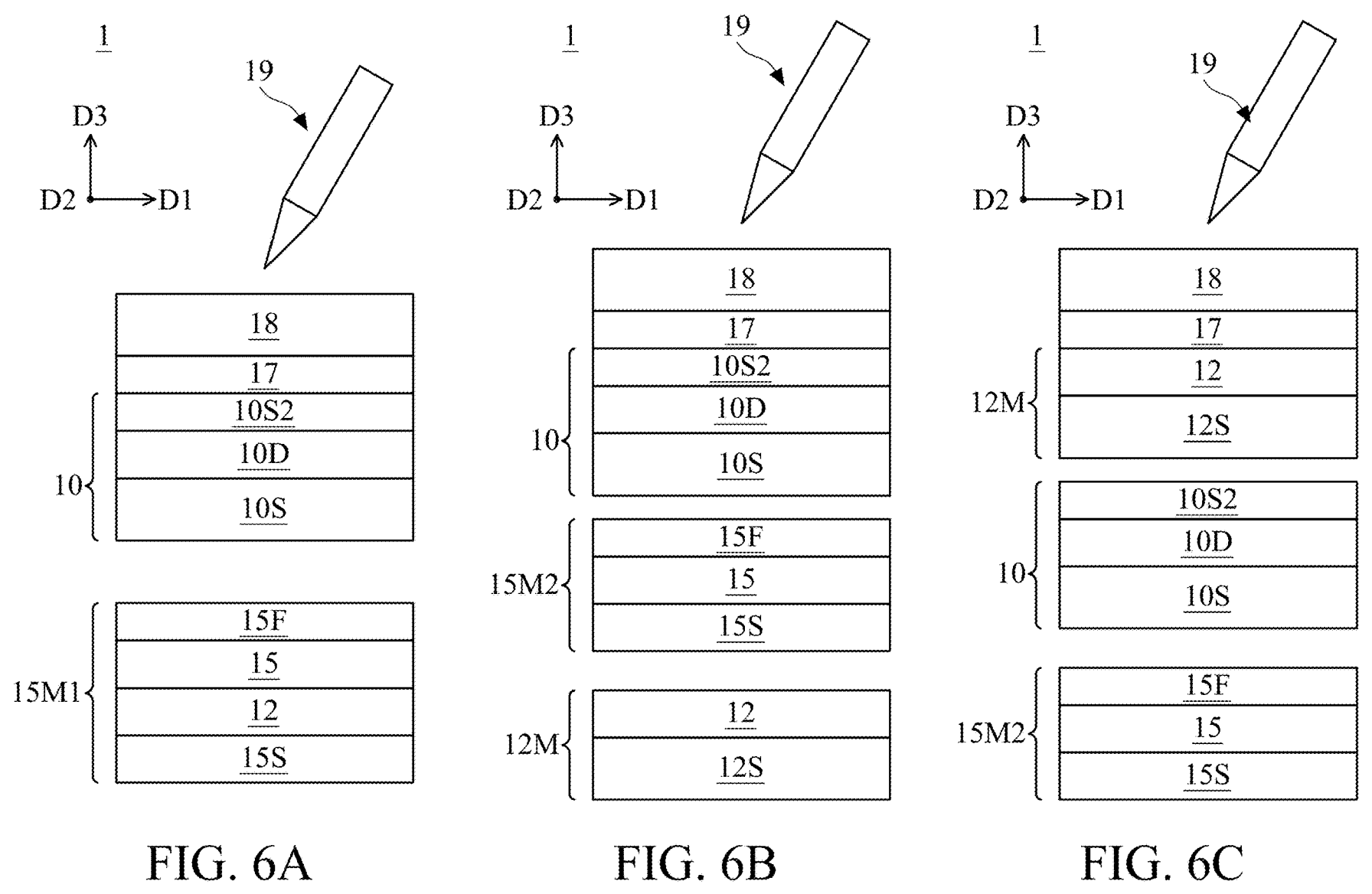

As shown in FIG. 1, in some embodiments, the touch layer 12 may include an electromagnetic coil, such as a coil loop used for scanning to identify the coordinates of the electromagnetic induction element. As shown in FIGS. 6A to 6C, the electronic device 1 may include the electromagnetic induction element 19, and the electromagnetic induction element 19 may be used to sense the electromagnetic coil of the touch layer 12. For example, the electromagnetic induction element 19 may be or may include a stylus, but the present disclosure is not limited thereto. According to some embodiments, the period during which the touch control unit 13 provides the touch signal TS may be the period during which the touch layer 12 and the electromagnetic induction element 19 perform sensing. In some embodiments, the touch sensing operation of the touch layer 12 may be as described below, but the present disclosure is not limited thereto. As shown in FIGS. 1 and 6A, first, the touch control unit 13 provides current to the circulating coil of the touch layer 12 to generate a specific magnetic field. In this case, the resonance loop of the electromagnetic induction element within the aforementioned magnetic field range is induced changes in the magnetic field, thus accumulating weak energy. Then, the touch control unit 13 stops providing current to the circulation coil of the touch layer 12 and switches the circulation coil of the touch layer 12 to the receiving loop. In this case, the resonance loop of the electromagnetic induction element transmits the previously accumulated energy back to the touch layer 12 through free oscillation. In this way, by scanning the electrical changes of the circulating coil, the approximate position of the electromagnetic induction element may be initially determined. Finally, the circulating coil around the aforementioned position may be scanned to accurately calculate the coordinates of the electromagnetic induction element 19.

FIGS. 6A to 6C are schematic cross-sectional views showing the structure of the electronic device 1 according to some embodiments of the present disclosure. As shown in FIG. 6A, in some embodiments, the touch layer 12 overlaps the display panel 10. For example, the touch layer 12 may partially or completely overlap the display panel 10 in the top view direction D3 (or thickness direction) of the display panel 10. In some embodiments, the top view area of the touch layer 12 may be similar or the same as the top view area of the display panel 10, but the present disclosure is not limited thereto. The top view direction D3 may be a direction perpendicular to the normal line of the display panel 10.

As shown in FIG. 1, the touch control unit 13 is electrically connected to the touch layer 12 and is used to provide the touch signal TS to control the touch layer 12 to perform the touch sensing (for example, the touch sensing operation described above). In some embodiments, the touch control unit 13 may provide the touch signal TS at a fixed period. For example, the touch control unit 13 may provide the touch signal TS in a period of multiple display screens (frames). For example, as shown in FIG. 5, during the first frame Fa, the touch control unit 13 provides a touch signal. During the second frame Fb, the touch control unit 13 does not provide a touch signal. In detail, between two first frames Fa, there are (the number of) M second frames Fb. That is, between two first frames Fa in which the touch signal TS is present, the (number of) M second frames Fb in which the touch signal TS is not present may be present.

As above-mentioned, in some embodiments, as shown in FIG. 5, the image screen (frame) may be divided into the first frame Fa and the second frame Fb according to the presence or absence of the touch signal TS. Specifically, the touch signal TS is provided during the first frame Fa (that is, the touch sensing operation is performed), and the touch signal TS is not provided during the second frame Fb (that is, the touch sensing operation is not performed). The display panel 10 may be used to continuously display a plurality of frames according to a plurality of synchronization signals. For example, as shown in FIG. 5, the display panel 10 displays the frame F1 according to the synchronization signal Vsync_1, displays the frame F2 according to the synchronization signal Vsync_2, displays the frame F3 (not shown) according to the synchronization signal Vsync_3, and so on. These frames include two first frames Fa displayed in sequence and the (number of) M second frames Fb between the two first frames Fa. In some embodiments, M may be a positive integer between 2 and 15, but the present disclosure is not limited thereto. For example, M may be 2, 3, 6, 9, 12, or 15. When M=2 frames are present, it means that the two touch signals TS are separated by 2 frames, that is, one touch sensing is performed every M+1=3 frames. Alternatively, when M=6 frames are present, it means that the two touch signals TS are separated by 6 frames, that is, one touch sensing is performed every M+1=7 frames. The specific timing diagram will be described in detail below.

As shown in FIG. 1, the processing unit 14 is electrically connected to the timing control unit 11 and the touch control unit 13 and generates the light-emitting signal LS according to the synchronization signal Vsync and the touch signal TS. In some embodiments, the processing unit 14 includes a logic gate, such as an AND gate, a NAND gate, a NOR gate, combinations thereof, or other suitable logic gates, but the present disclosure is not limited thereto. Specifically, the logic gate receives the synchronization signal Vsync and the touch signal TS and provides the light-emitting signal LS according to the relationship between the potential level of the synchronization signal Vsync and the potential level of the touch signal TS. This light-emitting signal LS is used to control the operation of the light-emitting layer 15 or to control the light-emitting mode of the light-emitting layer 15. The detailed descriptions are shown as following.

TABLE 1

| The logic of AND gate | | |
| input | | output |
| synchronization signal | touch signal | light-emitting signal |
| 1 | 1 | 1 |
| 1 | 0 | 0 |
| 0 | 1 | 0 |
| 0 | 0 | 0 |

Take the AND gate in Table 1 as an example. When the potential level of the received synchronization signal Vsync is high (or represented by "1"), and the potential level of the received touch signal TS is also high (or represented by "1"), it means that the image screen is displayed and the touch sensing operations are performed simultaneously (i.e., the first frame Fa defined above). In this case, the potential level of the light-emitting signal LS output by the AND gate (of the processing unit 14) is high (or represented by "1"). This light-emitting signal LS is used to notify the light-emitting layer 15 to stop emitting light. In this way, the touch signal TS controlling the touch layer and the scan signal controlling the light-emitting layer may be prevented from interfering with each other. On the other hand, when the potential level of the received synchronization signal Vsync is high (or represented by "1") or low (or represented by "0"), and the received touch signal TS is low (or represented as "0"), it means that the image screen is displayed but the touch sensing operation is not performed simultaneously (that is, the second frame Fb defined above). In this case, the potential level of the light-emitting signal LS output by the AND gate (processing unit 14) is low (or represented by "0"), and this light-emitting signal LS does not trigger the operation of turning off the light-emitting layer 15. That is, the light-emitting layer 15 maintains light-emitting.

According to some embodiments, the above logic is used to make the present disclosure clearer and easier to understand but is not intended to limit the present disclosure. In other embodiments, other types of logic gates or other configurations (for example, a combination of multiple NAND gates or a combination of multiple NAND gates) may be used to determine whether the potentials of the touch signal TS are high or low (or none), thereby controlling the operation of the light-emitting layer 15.

In some embodiments, as shown in FIG. 6A, the light-emitting layer 15 may overlap the display panel 10 and be used to provide a light source to the display panel 10. For example, the light-emitting layer 15 may partially or completely overlap the display panel 10 in the top view direction D3 of the display panel 10. In some embodiments, the top view area of the light-emitting layer 15 may be similar or the same as the top view area of the display panel 10, but the present disclosure is not limited thereto.

Figure 4:
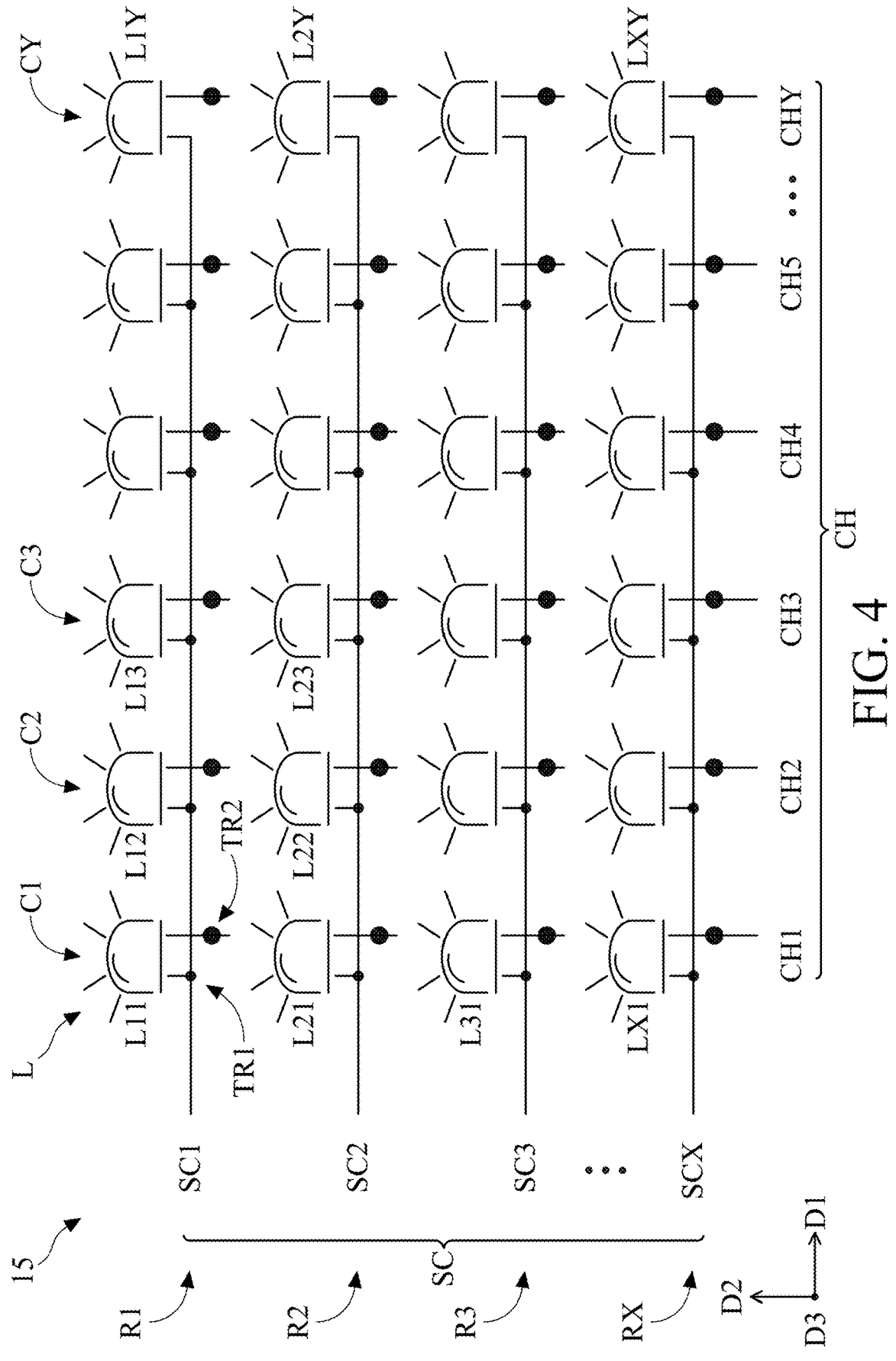
FIG. 4 is a schematic diagram showing the light-emitting units according to some embodiments of the present disclosure.

In some embodiments, as shown in FIG. 4, the light-emitting layer 15 includes the light-emitting units L arranged in a matrix, and the light source driving unit 16 is configured to scan these light-emitting units L. For example, the light-emitting units L may be or may include a light-emitting diode, such as an organic light-emitting diode, an inorganic light-emitting diode, mini light-emitting diodes (mini LEDs), micro light-emitting diodes (micro LEDs), quantum dot light-emitting diodes (quantum dot LED), combinations thereof, or other suitable diodes, but the present disclosure is not limited thereto. Specifically, the multiple (rows of) light-emitting units may be divided into (the number of) X groups based on the principle of visual persistence, and the (number of) X group of light-emitting units may turn on and off sequentially within a period that is imperceptible to the human eye to reduce the energy consumption of the electronic device 1. In some embodiments, this light-emitting method may be called a scan type light-emitting method. In some embodiments, X may be a positive integer between 2 and 15. For example, X may be 2, 3, 6, 9, 12, or 15. When X is 2, it means that the light-emitting layer 15 has two groups of light-emitting units that emit light sequentially. When X is 6, it means that the light-emitting layer 15 has six groups of light-emitting units that emit light sequentially.

As shown in FIGS. 1 and 5. The light source driving unit 16 is electrically connected to the processing unit 14 and controls the light-emitting layer 15 to emit light in the first light-emitting mode during the first frame Fa and emit light in the second light-emitting mode during the second frame Fb according to the light-emitting signal LS, wherein the first light-emitting mode and the second light-emitting mode are different. Specifically, in the first light-emitting mode, the first frame Fa includes the stop period SP and the first light-emitting period LP1, wherein the light-emitting layer 15 does not emit light in the stop period SP and emits light in the first light-emitting period LP1. In the second light-emitting mode, the second frame Fb includes the second light-emitting period LP2 and does not include the stop period. That is, in the second frame Fb, the light-emitting layer 15 continues to emit light and does not stop. According to some embodiments, during the sequential first frame Fa and the second frame Fb, the light-emitting layer 15 emits light in the first light-emitting period LP1 of the first frame Fa and emits light in the second light-emitting period LP1 of the second frame Fb. LP2, and the light-emitting layer 15 continues to emit light during the first light-emitting period LP1 and the second light-emitting period and does not stop.

When the light source driving unit 16 controls the light-emitting layer 15 to be in the first light-emitting mode, the light-emitting layer 15 stops emitting light for a period of time in the current display screen (i.e., the first frame), and emits light for a period of time in the current display screen (i.e., the first frame). Since the X groups (X rows) of light-emitting units in the light-emitting layer 15 emit light sequentially, "stop emitting light for a period of time" means that no one of the light-emitting units in the current display screen (that is, the first frame Fa) is emitted during a specific period of time. "Emit light for a period of time" means that at least one group of light-emitting units emits light within a specific period of the current display screen (i.e., the first frame Fa). On the other hand, when the light-emitting layer 15 is in the second light-emitting mode, the light-emitting layer 15 emits light throughout the current display screen (i.e., the second frame). "Emit light throughout . . . " means that at least one group of light-emitting units is emitting light during the entire period of the current display screen (that is, the second frame Fb).

As shown in FIG. 4, which is a schematic diagram showing the light-emitting unit according to some embodiments of the present disclosure. As shown in the figure, in some embodiments, the light-emitting layer 15 may include the light-emitting units L (for example, the light-emitting units L11 to LXY), the scan signal lines SC, and the channel signal lines CH, which are disposed on the substrate (For example, the substrate 15S in FIG. 6A). For example, the scan signal lines SC may include (the number of) X scan signal lines SC1, SC2, SC3, . . . , SCX extending along the direction D1, which are electrically connected to respective corresponding light-emitting units L. On the other hand, the channel signal lines CH may include (the number of) Y channel signal lines CH1, CH2, CH3, CH4, CH5, . . . , CHY extending along the direction D2, which are electrically connected to respective corresponding light-emitting elements L. The direction D1 and the direction D2 are different, for example, the direction D1 is perpendicular to the direction D2. It should be understood that the present disclosure does not limit the number and spatial arrangement of the scan signal lines SC and the channel signal lines CH.

As shown in FIG. 4, the light-emitting units L may be arranged in a matrix, for example, the light-emitting units L may include X×Y light-emitting units disposed on a substrate (for example, the substrate 15S in FIG. 6A). Specifically, the light-emitting units L include light-emitting units in (the number of) X rows (for example, R1 to RX) and (the number of) Y columns (for example, C1 to CY). The rows extend along the direction D1, and the columns extend along the direction D2. X and Y are positive integers, and X may be greater than, less than, or equal to Y. X and Y may individually be between 1 and 150, such as between 1 and 128, between 2 and 128, between 2 and 100, between 2 and 50, between 4 and 25, between 4 and 20, or between 5 and 15. When X=1, Y is greater than 1 and within the above range. When Y=1, X is greater than 1 and within the above range. A light-emitting unit may be marked as Lab, which represents the light-emitting unit at row a and column b. For example, the light-emitting unit at the first row R1 and the first column C1 is marked as L11, the light-emitting unit at the second row R2 and the first column C1 is marked as L21, and the light-emitting unit at the second row R2 and the third column C3 is marked as L23.

In some embodiments, the light-emitting units L may be direct-type backlights to provide light sources for the display panel 10. The light-emitting units L may be a scanning backlight, that is, X×Y light-emitting units may be turned on sequentially according to the scan signal. As shown in FIG. 4, taking the light-emitting units L11 as an example, the first end TR1 of the light-emitting unit L11 may be electrically connected to the scan signal line SC1, and the second end TR2 of the light-emitting unit L11 may be electrically connected to the channel signal line CH1. In some embodiments, the first end TR1 may be a positive electrode, and the second end TR2 may be a negative electrode. In some embodiments, the first end TR1 may be a negative electrode, and the second end TR2 may be a positive electrode. The light-emitting units in the same row may be electrically connected to the same scan signal line. For example, the light-emitting units L11, L12 . . . L1Y in the same row are electrically connected to the same scan signal line SC1. The light-emitting units in the same column may be electrically connected to the same channel signal line. For example, the light-emitting units L11, L21 . . . LX1 in the same column are electrically connected to the same channel signal line CH1.

The light source driving unit 16 may determine the magnitude of the conduction current of each signal line in the channel signal line CH to determine the brightness of the light source L. After the corresponding light sources L are turned on sequentially by the scan signal line SC1 to the scan signal line SCX, the light sources L are turned on sequentially again by the scan signal line SC1 to the scan signal line SCX to repeat the above actions, thereby completing the continuous scanning of the scan signal line SC. The light-emitting units and the scan signal lines SC may be electrically connected through a switching element (not shown), and the switching element may control the conduction of the scan signal lines SC. The scan signal lines SC1, SC2 . . . SCX are turned on in time sequence to complete the scanning of all X×Y light-emitting units.

For example, as shown in FIGS. 4 and 5, taking X=8 as example, when there are 8 scan signal lines SC, the scan signal lines SC1, SC2 . . . SC8 are turned on in time sequence to complete the scanning of the XXY light-emitting units during the light-emitting periods LP1 and LP2. Data may be input through the channel signal line CH, and the brightness and dimming information of the light-emitting units of each individual column may be controlled according to the data. In this way, in the light-emitting layer 15, through the scanning of the scan signal line SC and the data input by the signal line CH, the brightness and dimming information of individual light-emitting units may be controlled, and the regional brightness change of the light sources L of the light-emitting layer 15 may be achieved. In the above, the possible configurations of the electronic device 1 and the functions of each component have been disclosed, and this electronic device 1 has good display effects and good touch effects. In the following, the timing control process of the electronic device 1 will be further explained.

As shown in FIGS. 1 to 5, wherein FIG. 5 is a timing diagram showing the electronic device according to some embodiments of the present disclosure. As shown in the figure, the timing control unit 11 provides the synchronization signals Vsync to the display panel 10 and the processing unit 14 in a fixed cycle, wherein each synchronization signal Vsync represents the start of one display screen (frame). For example, in terms of sequence, the timing control unit 11 provides the synchronization signals Vsync_1, Vsync_2, . . . Vsync_q, Vsync_q+1 . . . and so on. On the other hand, in terms of type, the timing control unit 11 provides the first synchronization signal Vsync_a and the second synchronization signal Vsync_b.

Then, the display panel 10 may continuously display multiple image screens according to the multiple synchronization signals Vsync. For example, in terms of sequence, the display panel 10 displays the image screens F1, F2, . . . , Fq . . . , etc. according to the synchronization signals Vsync_1, Vsync_2, . . . Vsync_q . . . , etc. That is, one synchronization signal Vsync activates one image screen (or frame), for example, the synchronization signal Vsync_1 activates the image screen F1, the synchronization signal Vsync_2 activates the image screen F2 . . . . On the other hand, in terms of type, the display panel 10 displays the first frame Fa or the second frame Fb according to the synchronization signal Vsync_a or Vsync_b.

For example, as shown in FIGS. 3 and 5, the display units P in the first row may be scanned through the gate line G1, and the display units P in the second row may be scanned through the gate line G2 . . . . The display units P in the Z-th row is scanned through the gate line GZ. In this way, starting from the synchronization signal Vsync, the gate driving unit 102 sequentially scans the display units P of the first row, the second row . . . to the last row (the Z-th row), and the total length is one display screen (one frame) time.

As shown in FIGS. 3 and 5, during the first frame Fa, the gate driving unit 102 scans a plurality of display units in the display panel 10 through the gate lines G1, G2, . . . , GZ. Similarly, during the second frame Fb, the gate driving unit 102 scans the display units in the display panel 10 through the gate lines G1, G2, . . . , GZ. In some embodiments, the gate line G1 may start scanning after the first synchronization signal Vsync_a or the second synchronization signal Vsync_b, but the present disclosure is not limited thereto. In some embodiments, as shown in FIG. 5, the first synchronization signal Vsync_a or the second synchronization signal Vsync_b is received immediately when the scanning of the gate line GZ ends, but the present disclosure is not limited thereto. In some embodiments, as shown in FIG. 5, the scanning times of the respective gate lines G1, G2, . . . , GZ are connected to each other, but the present disclosure is not limited thereto. In some embodiments, the scanning time of the gate line G1 may overlap the first synchronization signal Vsync_a or the second synchronization signal Vsync_b.

On the other hand, the touch control unit 13 provides the touch signal TS to the touch layer 12 and the processing unit 14 in a fixed cycle, wherein the period of providing the touch signal TS overlaps the period of providing the synchronization signal Vsync. In other words, the display panel 10 displays the first frame Fa and the second frame Fb according to the synchronization signal Vsync, wherein the first frame Fa is an image screen (frame) with the touch signal TS present, and the second frame Fb is an image screen without the touch signal TS.

In the first frame Fa, the processing unit 14 provides the light-emitting signal LS to the light source driving unit 16 according to the high-potential synchronization signal Vsync and the high-potential touch signal TS (for example, determined by a logic gate), so that the light source driving unit 16 controls the light-emitting layer 15 to be in the first light-emitting mode during the period when the display panel 10 displays the first frame Fa. Specifically, the light source driving unit 16 causes the light-emitting layer 15 to stop emitting light in the stop period SP of the first light-emitting mode until the end of the period of providing the touch signal TS. In other words, the stop period SP overlaps the period during which the touch signal TS is provided. Then, the light source driving unit 16 sequentially provides (the number of) X scan signals SS in the first light-emitting period LP1 of the first light-emitting mode to control the (number of) X groups of light-emitting units L in the light-emitting layer 15 to emit light, where X is a positive value between 2 and 15. integer. Taking the embodiment shown in FIG. 5 as an example, there are 8 light-emitting units L (that is, X=8), so the scan signal SS includes scan signal S1 to scan signal S8. In other words, the first light-emitting period LP1 does not overlap the period in which the touch signal TS is provided, and the period in which the touch signal TS is provided is before the first light-emitting period LP1. In this way, the touch signal TS controlling the touch layer 12 and the scan signal SS controlling the light-emitting layer 15 are prevented from interfering with each other.

As above mentioned, taking X=8 in FIG. 4 as an example, the light source driving unit 16 may cause the light-emitting layer 15 to perform light-emitting with scan type according to the scan signals S1 to S8. According to some embodiments, as shown in FIGS. 4 and 5, during the sequential first frame Fa and the second frame Fb, the light-emitting layer 15 is continuously performed light-emitting with scan type in the first light-emitting period LP1 of the first frame Fa and the second light-emitting period LP2 of the second frame Fb.

Taking the scan signals S1 to S8 as one scan cycle, within the sum of period (t5+t6) of the first light-emitting period LP1 and the second light-emitting period LP2, after performing one scanning period of light-emitting, the next scanning period may proceed to emit light. The sum of period (t5+t6) of the first light-emitting period LP1 and the second light-emitting period LP2 may include at least one scanning period, for example, it may include 1 to 15 scanning periods according to the design, such as 2 to 10 scanning periods or 3 to 8 scanning periods. As shown in FIG. 5, the sum of period of the first light-emitting period LP1 and the second light-emitting period LP2 includes three scanning periods, and the time point at which the second light-emitting period LP2 ends is the time point at which the scan signal S8 ends. Alternatively, according to some embodiments, although not shown in the figure, the time point at which the second light-emitting period LP2 ends may not be the time point at which the scan signal S8 ends, for example, it may be the time point at which the scan signal S4 ends.

The scan signal SS of the first light-emitting period LP1 starts from the scan signal S1 but does not necessarily end with the scan signal S8. For example, taking the embodiment shown in FIG. 5 as an example, the first light-emitting period LP1 starts with the scan signal S1 and partially overlaps the scan signal S1 at the end. In other words, the total length of the first light-emitting period LP1 may be less than or greater than the total length of the scan signal S1 to the scan signal S8, which is not limited to being equal to the total length of the scan signal S1 to the scan signal S8.

As shown in FIG. 5, in the second frame Fb, the processing unit 14 provides the light-emitting signal LS to the light source driving unit 16 according to the high-potential synchronization signal Vsync and the low-potential touch signal TS (for example, determine by the logic gate), so that the light source driving unit 16 controls the light-emitting layer 15 to be in the second light-emitting mode during the period when the display panel 10 displays the second frame Fb. Therefore, the light source driving unit 16 continues to provide the scan signal SS in the second light-emitting period LP2 of the second light-emitting mode to control the light-emitting units in the light-emitting layer 15 to perform light-emitting with scan type. In FIG. 5, X=8 is taken as an example, but the present disclosure is not limited thereto. According to some embodiments, the above-mentioned "sequentially providing" refers to sequentially providing the next scan signal SS (for example, the (x+1)-th scan signal) according to the last scan signal SS (for example, the x-th scan signal) in the previous image screen (frame). Specifically, although not shown in the figure, for example, for the first frame Fa and the second frame Fb that are displayed sequentially, the last scan signal in the first frame Fa is S5, and the first scan signal in the second frame Fb may be S6, wherein the scan signals S5 and S6 are sequential scan signals. In other words, without overlapping the touch signal TS, starting from the first light-emitting period LP1 of the first frame Fa, the first scan signal SS to the X-th scan signal SS may be repeatedly provided in sequence until the next touch signal TS appears. For example, the scan signal S1 to the scan signal S8 are provided, and then the scan signal S1 to the scan signal S8 are provided again. Specifically, as shown in FIG. 5, although the figure does not clearly show that, during the sum of period Tsum of the first frame Fa (F1) and the (number of) M second frames Fb, the light-emitting layer continues to emit light with scan type according to the continuous scan signal S1 to scan signal S8 until the next touch signal TS appears, that is, until time proceeds to the next first frame Fa (for example, Fq in FIG. 5). Taking the scan signals S1 to S8 as one scan period, multiple scan periods may be repeated within the sum of period Tsum of the first frame Fa (F1) and the (number of) M second frames Fb.

In some embodiments, the length t1 of the first frame Fa is the same as the length t2 of the second frame Fb. For example, when the update frequency of the display panel 10 is 60 Hz, the length t1 of the first frame Fa is equal to the length t2 of the second frame Fb and is equal to 16.66 ms. When the update frequency of the display panel 10 is 120 Hz, the length t1 of the first frame Fa is equal to the length t2 of the second frame Fb and is equal to 8.33 ms. When the update frequency of the display panel 10 is 240 Hz, the length t1 of the first frame Fa is equal to the length t2 of the second frame Fb and is equal to 4.16 ms. However, the present disclosure is not limited thereto. The update frequency of the display panel 10 may also be other values, such as 144 Hz.

In some embodiments, the length t3 of providing the touch signal TS is the same as the length t4 of the stop period SP. In some embodiments, the sum of the length t4 of the stop period SP and the length t5 of the first light-emitting period LP1 (t4+t5) is equal to the length t6 of the second light-emitting period LP2.

In some embodiments, the length t3 for providing the touch signal TS is between 1 ms and 50 ms, such as between 1 ms and 12 ms or between 3 ms and 25 ms, but the present disclosure is not limited thereto. For example, the length t3 may be 1.8 ms, 3.8 ms, 5.8 ms, 7.8 ms, 9.8 ms, 11.8 ms, or any value or range between the above values. In some embodiments, the length t4 of the stop period SP is between 1 ms and 50 ms, such as between 1 ms and 12 ms or between 3 ms and 25 ms, but the present disclosure is not limited thereto. For example, the length t4 may be 1.8 ms, 3.8 ms, 5.8 ms, 7.8 ms, 9.8 ms, 11.8 ms, or any value or range between the above values. In some embodiments, the length t5 of the first light-emitting period LP1 is between 1 ms and 20 ms, such as between 1 ms and 6 ms or between 2 ms and 15 ms. For example, the length t5 may be 1.53 ms, 2.53 ms, 3.53 ms, 4.53 ms, 5.53 ms, or any value or range between the above values. In some embodiments, the length t6 of the second light-emitting period LP2 is between 1 ms and 20 ms, such as between 2 ms and 20 ms or 8 ms and 20 ms. For example, the length t6 may be 4.16 ms, 6.94 ms, 8.33 ms, 16.66 ms, or any value or range between the above values.

In some embodiments, the electronic device 1 may be applied to In-Cell structures, Out-Cell structures, and other types of display structures. The position of the touch layer 12 is not limited. For example, the touch layer 12 may be provided of an in-cell type. For example, the touch layer 12 may be embedded in a light source module. As shown in FIG. 6A, the light source module 15M1 may include the light-emitting layer 15 and the touch layer 12. Alternatively, the touch layer 12 may be provided of an out-cell type. For example, the touch layer 12 and the light-emitting layer 15 may be in separate modules, as shown in FIGS. 6B and 6C. The touch layer 12 may be provided in the touch panel 12M, and the light-emitting layer 15 may be provided in the light source module 15M2. The touch panel 12M and the light source module 15M2 are separate modules. For ease of understanding, possible configurations of the electronic device 1 in different display structures will be provided below with reference to FIGS. 6A to 6C. Among them, FIGS. 6A to 6C are respectively schematic diagrams showing the different structures of the electronic device 1 according to some embodiments of the present disclosure.

As shown in FIG. 6A, the electronic device 1 may include the display panel 10 and the light source module 15M1. In some embodiments, the display panel 10 may include a plurality of stacked film layers. For example, the display panel 10 may include the first substrate 10S1, the display layer 10D, and the second substrate 10S2, but the present disclosure is not limited thereto. According to some embodiments, the first substrate 10S1 and the second substrate 10S2 may be a rigid substrate or a flexible substrate respectively. The first substrate 10S1 and the second substrate 10S2 may respectively be made of glass, plastic, quartz, or a combination thereof. In some embodiments, the display layer 10D may include film layers such as a liquid crystal layer, a pixel layer, an electrode layer, a circuit layer, etc., but the present disclosure is not limited thereto. According to some embodiments, the display layer 10D may include the display units P, the source driving units 101, the gate driving units 102, the gate lines, the data lines, or a combination thereof as described in FIG. 3.

In the embodiment shown in FIG. 6A, the display panel 10 is disposed on the light source module 15M1, and the light source module 15M1 may be used to provide a light source for the display panel 10. The light source module 15M1 may include the substrate 15S, the light-emitting layer 15, and the touch layer 12. The light-emitting layer 15 and the touch layer 12 are provided on the substrate 15S, and the light-emitting layer 15 is between the display panel 10 and the touch layer 12. In other words, these embodiments are structures in which the touch unit (i.e., the touch layer 12) and the light-emitting units (i.e., the light-emitting layer 15) share one substrate (i.e., the substrate 15S), which is the in-cell type construct in which the touch unit disposed in the light source module. In some embodiments, the light source module 15M1 further includes the optical film 15F disposed between the light-emitting layer 15 and the display panel 10. In some embodiments, the optical film 15F may include wavelength conversion materials, fluorescence, phosphorescence, other suitable materials, or a combination thereof, but the present disclosure is not limited thereto. The optical film 15F may include a diffusion film, a brightness enhancement film (BEF), a wavelength conversion film, a quantum dot film (QD Film), a blue gain film, a fluorophore film, or a combination thereof. The optical film 15F may be a single layer or multiple layers. The material of the optical film 15F may be or may include polyethylene terephthalate (PET), poly(methyl methacrylate) (PMMA), polyethylene terephthalate naphthalate (PEN), polyvinylidene difluoride (PVDF), triacetyl cellulose (TAC), combinations thereof, or other suitable materials, but the present disclosure is not limited thereto.

In the embodiment shown in FIG. 6A, the electronic device 1 may further include the adhesive layer 17 and the covering substrate 18. The adhesive layer 17 is used to adhere the display panel 10 (for example, the substrate 10S2 in the display panel 10) and the cover substrate 18. In some embodiments, the adhesive layer 17 may be or may include a light-transmitting material, such as silicone resin, epoxy resin, acrylic resin, combinations thereof, or other suitable materials, but the present disclosure is not limited thereto. The covering substrate 18 is used to prevent dust, moisture, or impurities from entering the display panel 10. In some embodiments, the cover substrate 18 may be provided with sufficient hardness to prevent external objects from causing damage to the display panel 10. In some embodiments, the material of the cover substrate 18 may be or may include glass, polyimide (PI), polyethylene terephthalate (PET), combinations thereof, or other suitable materials, but the present disclosure is not limited thereto. In some embodiments, the touch layer 12 may include an electromagnetic coil. The electronic device 1 may further include the electromagnetic induction element 19, and the electromagnetic induction element 19 is used to sense the electromagnetic coil of the touch layer 12. Specifically, the electromagnetic induction element 19 may be an element such as a stylus, but the present disclosure is not limited thereto. The electromagnetic induction element 19 may scan the electromagnetic coil in the touch layer 12 to identify the touch coordinate position where the electromagnetic induction element 19 is located.

As shown in FIG. 6B, the electronic device 1 may include the display panel 10, the light source module 15M2, and the touch module 12M. The light source module 15M2 includes the substrate 15S and the light-emitting layer 15 provided on the substrate 15S (and optionally the optical film 15F provided on the light-emitting layer 15), and the touch module 12M includes the substrate 12S and the touch layer 12 provided on the substrate 12S. In these embodiments, the light source module 15M2 is between the display panel 10 and the touch layer 12 of the touch module 12M. Compared with the embodiment shown in FIG. 6A, the touch unit (i.e., the touch layer 12) and the light-emitting unit (i.e., the light-emitting layer 15) of the embodiment of FIG. 6B do not share one substrate.

As shown in FIG. 6C, the electronic device 1 may include the display panel 10, the touch module 12M, and the light source module 15M2. Similar to FIG. 6B, the touch module 12M includes the substrate 12S and the touch layer 12 disposed on the substrate 12S, and the light source module 15M2 includes the substrate 15S and the light-emitting layer 15 disposed on the substrate 15S (and the optionally optical film 15F disposed on the light-emitting layer 15). In these embodiments, the display panel 10 is between the touch module 12M and the light-emitting layer 15 of the light source module 15M2. Compared with the embodiment shown in FIG. 6A, the touch unit (i.e., the touch layer 12) and the light-emitting unit (i.e., the light-emitting layer 15) of the embodiment of FIG. 6C do not share one substrate.

As mentioned above, in the present disclosure, through specific configuration and specific timing control, the light-emitting layer may emit light with different light-emitting modes during the different frames. According to some embodiments, in the first light-emitting mode of the first frame, the touch signal TS is staggered with the light-emitting period, so that the touch signal TS and the scan signal SS of the light-emitting layer do not interfere with each other. In the second light-emitting mode of the second frame, the light-emitting layer may continue to emit light and maintain sufficient brightness.

In addition, the scope of the present disclosure is not limited to the process, machine, manufacturing, material composition, device, method, and step in the specific embodiments described in the specification. A person of ordinary skill in the art will understand current and future processes, machine, manufacturing, material composition, device, method, and step from the content disclosed in some embodiments of the present disclosure, as long as the current or future processes, machine, manufacturing, material composition, device, method, and step performs substantially the same functions or obtain substantially the same results as the present disclosure. Therefore, the scope of the present disclosure includes the abovementioned process, machine, manufacturing, material composition, device, method, and steps. It is not necessary for any embodiment or claim of the present disclosure to achieve all of the objects, advantages, and/or features disclosed herein.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:

a display panel;

a timing control unit electrically connected to the display panel and used to provide a plurality of synchronization signals, wherein the display panel displays a first frame according to a first synchronization signal of the plurality of synchronization signals, and displays a second frame according to a second synchronization signal of the plurality of synchronization signals;

a touch layer overlapping the display panel;

a touch control unit electrically connected to the touch layer and used to provide a touch signal;

a processing unit electrically connected to the timing control unit and the touch control unit, and used to generate a light-emitting signal according to the plurality of synchronization signals and the touch signal;

a light-emitting layer overlapping the display panel and used to provide a light source to the display panel; and a light source driving unit electrically connected to the processing unit, wherein the light source driving unit controls the light-emitting layer to emit light in a first light-emitting mode during the first frame and controls the light-emitting layer to emit light in a second light-emitting mode during the second frame according to the light-emitting signal, wherein the first light-emitting mode and the second light-emitting mode are different, wherein in the first light-emitting mode, the first frame comprises a stop period and a first light-emitting period, wherein the light-emitting layer does not emit light during the stop period, and the light-emitting layer emits light during the first light-emitting period, wherein in the second light-emitting mode, the light-emitting layer continues to emit light during the entire period of the second frame.

2. The electronic device as claimed in claim 1, wherein the second frame comprises a second light-emitting period, and the length of the second light-emitting period is between 1 ms and 20 ms.

3. The electronic device as claimed in claim 1, wherein the second frame comprises a second light-emitting period, and a sum of a length of the stop period and a length of the first light-emitting period is equal to the length of the second light-emitting period.

4. The electronic device as claimed in claim 1, wherein the first frame is adjacent to the second frame.

5. The electronic device as claimed in claim 4, wherein the display panel is used to continuously display a plurality of frames, the plurality of frames comprise two first frames displayed sequentially and M second frames between the two first frames, wherein M is a positive integer between 2 and 15.

6. The electronic device as claimed in claim 1, wherein in the first frame, the stop period overlaps a period of providing the touch signal, and the first light-emitting period does not overlap the period of providing the touch signal.

7. The electronic device as claimed in claim 6, wherein in the first frame, the period of providing the touch signal is before the first light-emitting period.

8. The electronic device as claimed in claim 1, wherein in the first frame, a length of the stop period is between 1 ms and 12 ms.

9. The electronic device as claimed in claim 1, wherein in the first frame, a length of the first light-emitting period is between 1 ms and 20 ms.

10. The electronic device as claimed in claim 1, wherein a length of providing the touch signal is the same as a length of the stop period.

11. The electronic device as claimed in claim 1, wherein the light-emitting layer comprises a plurality of light-emitting units, and the light source driving unit is configured to cause the plurality of light-emitting units to scan.

12. The electronic device as claimed in claim 11, wherein the plurality of light-emitting units are arranged in X rows and Y columns, and the light source driving unit sequentially turns on the light-emitting units by rows or columns.

13. The electronic device as claimed in claim 12, wherein X and/or Y are positive integers between 1 and 150.

14. The electronic device as claimed in claim 1, further comprising a light source module, wherein the light source module comprises a substrate, the touch layer, and the light-emitting layer, wherein the light-emitting layer and the touch layer are disposed on the substrate.

15. The electronic device as claimed in claim 1, wherein the touch layer is provided of an in-cell type or an out-cell type.

16. The electronic device as claimed in claim 1, further comprising an electromagnetic induction element, wherein the touch layer comprises an electromagnetic coil, and the electromagnetic induction element is used to sense the electromagnetic coil of the touch layer.

17. The electronic device as claimed in claim 1, further comprising a gate driving unit used to scan the display panel during the first frame and the second frame.

18. The electronic device as claimed in claim 1, wherein the processing unit comprises an AND gate, a NAND gate, a NOR gate, or a combination thereof.

* * * * *